United States Patent [19]

Saitoh et al.

[11] Patent Number: 5,229,461
[45] Date of Patent: Jul. 20, 1993

[54] VINYLIDENE FLUORIDE COPOLYMER AND COMPOSITION CONTAINING THE SAME

[75] Inventors: Hideya Saitoh; Yoshiki Shimizu; Masayuki Oka; Akira Chida; Atsushi Sakakura, all of Settsu, Japan

[73] Assignee: Daikin Industries, Ltd., Osaka, Japan

[21] Appl. No.: 703,655

[22] Filed: May 21, 1991

[30] Foreign Application Priority Data

May 22, 1990 [JP] Japan .................................. 2-132915
Jun. 25, 1990 [JP] Japan .................................. 2-168086

[51] Int. Cl.$^5$ ............................................. C08L 27/12
[52] U.S. Cl. ...................... 525/200; 525/199
[58] Field of Search ................................ 525/199, 200

[56] References Cited

U.S. PATENT DOCUMENTS

| | | | |
|---|---|---|---|
| 4,028,431 | 6/1977 | Futami et al. | 525/199 |
| 4,197,380 | 4/1980 | Chao et al. | 525/199 |
| 4,345,057 | 8/1982 | Yamabe et al. | 526/249 |
| 4,575,533 | 3/1986 | Horle et al. | 525/72 |
| 4,612,351 | 9/1986 | Caporiccio et al. | 525/199 |
| 4,617,351 | 10/1986 | Heckel, Jr. et al. | 525/199 |
| 4,631,326 | 12/1986 | Koishi et al. | 526/249 |
| 4,731,417 | 3/1988 | Miyata et al. | 525/200 |
| 4,935,467 | 6/1990 | Cheng et al. | 525/199 |
| 4,954,589 | 4/1990 | Sugawara et al. | 526/255 |
| 5,008,340 | 4/1991 | Guerra et al. | 525/193 |

FOREIGN PATENT DOCUMENTS

| | | |
|---|---|---|
| 0328157 | 5/1985 | European Pat. Off. |
| 0190654 | 1/1986 | European Pat. Off. |
| 59-102962 | 6/1984 | Japan |
| 61-275311 | 12/1986 | Japan |

*Primary Examiner*—John Kight, III
*Assistant Examiner*—T. Mosley
*Attorney, Agent, or Firm*—Armstrong, Westerman, Hattori, McLeland & Naughton

[57] ABSTRACT

A vinylidene fluoride copolymer comprising 50 to 90% by mole of units having the formula (I):

$$-CH_2-CF_2- \qquad (I)$$

1 to 30% by mole of units having the formula (II):

$$-CF_2-CF- \qquad (II)$$
$$\phantom{-CF_2-}|$$
$$\phantom{-CF_2-}X$$

1 to 30% by mole of units having the formula (III):

$$-CH_2-CH- \qquad (III)$$
$$\phantom{-CH_2-}|$$
$$\phantom{-CH_2-}O-R^1OH$$

1 to 30% by mole of units having the formula (IV):

$$-CH_2-CH- \qquad (IV)$$
$$\phantom{-CH_2-}|$$
$$\phantom{-CH_2-}O-CO-R^2$$

and a composition comprising the copolymer as the main component. Since the copolymer is excellent in solvent solubility, it can be dissolved in a widely used solvent for coatings and it is not required to treat the film at a high temperature after coating. Moreover, the obtained film is excellent in adhesion to a substrate, glossiness, weatherability, stain resistance and corrosion resistance.

10 Claims, No Drawings

VINYLIDENE FLUORIDE COPOLYMER AND COMPOSITION CONTAINING THE SAME

BACKGROUND OF THE INVENTION

The present invention relates to a novel vinylidene fluoride copolymer having functional groups which is excellent in weatherability and is compatible with an acrylic resin, so which is suitable for use as coatings, sealing materials or raw materials for moldings such as films, a curable composition containing the same, and a coating composition comprising the same and an acrylic resin as main components.

Polyvinylidene fluoride (homopolymer of vinylidene fluoride) (PVDF) is, as well known, excellent in weatherability, chemical resistance and corrosion resistance. Further, PVDF is excellent in mechanical properties and processability, so it has been widely applied to various uses such as moldings, films and coatings. Particularly, when PVDF is used as the coating, PVDF is blended with a methyl methacrylate copolymer having good compatibility with PVDF for improving the light permeability.

Only solvents having very high polarity and a high boiling point such as N,N-dimethylformamide and N,N-dimethylacetoamide can dissolve PVDF because of high crystallinity. Accordingly, the use of PVDF as the coating is restricted. That is, a dispersion-type of an organosol wherein PVDF is dispersed in water or an organic solvent coating and a powdery coating have been put on the market. Both the coatings, however, require to treat the film at a high temperature for fixing the film after coating. Recently, an alternating copolymer of chlorotrifluoroethylene or tetrafluoro-ethylene and a vinyl ether or vinyl ester wherein crosslinkable and functional groups are incorporated into a part of the vinyl ether begins to be used as a curable fluorocarbon resin coating at room temperature which has an excellent weatherability (Japanese Examined Patent Publication No. 60-21686 and Japanese Unexamined Patent Publication No. 59-102962). Although the coatings as disclosed in the publications are improved in workability, they are inferior to the PVDF coatings in weatherability, stain resistance, corrosion resistance, and the like.

An object of the present invention is to provide a vinylidene fluoride copolymer having excellent solvent solubility, excellent compatibility with an acrylic resin alike PVDF, and functional groups curable at room temperature.

A further object of the present invention is to provide a curable composition comprising the above-mentioned vinylidene fluoride copolymer and a curing agent.

A still further object of the present invention is to provide a coating composition comprising the above-mentioned vinylidene fluoride copolymer and an acrylic resin which is capable of giving a film having excellent weatherbility, stain resistance and glossiness.

These and other objects of the present invention will become apparent from the description hereinafter.

SUMMARY OF THE INVENTION

In order to obtain a copolymer dissoluble in widely used solvents for coatings and curable by reaction, by modifying PVDF, study has been earnestly repeated.

It has now been found that when a vinylidene fluoride monomer is copolymerized with a hydrocarbon vinyl ester or a hydrocarbon vinyl ether monomer in a specific composition ratio, the copolymer can be easily obtained, though it has hitherto been recognized that it is hard to copolymerize the vinylidene fluoride monomer with the hydrocarbon vinyl ester or ether monomer. In case that the vinyl ether or ester monomer has a specific functional group, the obtained copolymer is not impaired in excellent weatherability, stain resistance and corrosion resistance originally existing in PVDF and is given a curability by reaction. Further, it has now been found that when the above-mentioned vinylidene fluoride copolymer is combined with a widely used acrylic resin, since the obtained copolymer has excellent compatibility with the acrylic resin, the obtained composition is improved in adhesion to substrates and stain resistance, though the fluorocarbon resin itself is poor in adhesion to substrates and stain resistance.

In accordance with the present invention, there is provided a vinylidene fluoride copolymer comprising 50 to 90% by mole of units having the formula (I):

1 to 30% by mole of units having the formula (II):

wherein X is fluorine atom, chlorine atom, hydrogen atom or trifluoromethyl group,
1 to 30% by mole of units having the formula (III):

wherein $R^1$ is an alkylene group having 2 to 10 carbon atoms, and
1 to 30% by mole of units having the formula (IV):

wherein $R^2$ is an aromatic group or an alkyl group having 1 to 10 carbon atoms.

Further, in accordance with the present invention, there is provided a curable composition comprising the above-mentioned vinylidene fluoride copolymer and a curing agent reactive with hydroxyl group existing in the copolymer, and a coating composition comprising (A) the above-mentioned vinylidene fluoride copolymer and (B) an acrylic resin.

DETAILED DESCRIPTION

The vinylidene fluoride copolymer (A) of the present invention is a vinylidene fluoride copolymer comprising units (I), units (II), units (III), units (IV) and, as occasion demands, other units (V). The vinylidene fluoride copolymer (A) has a number average molecular weight (Mn) measured by gel permeation chromatography of, preferably from 1,000 to 500,000, more preferably from 3,000 to 500,000, especially from 3,000 to 50,000, more especially from 5,000 to 50,000. It is preferable that the vinylidene fluoride copolymer (A) has an intrinsic viscosity [η] measured at 30° C. in tetrahydrofuran (THF) of 0.01 to 2.0 dl/g, more preferably from 0.04 to 2.0 dl/g. When Mn of the vinylidene fluoride copolymer (A) is more than 500,000, there is a tendency that the solvent solubility becomes poor. When such a copolymer is used as a coating composition, the solution concentration must be lowered from the viewpoint of the viscosity, accordingly it tends to lower the workability. When Mn is less than 1,000, it tends to lower the mechanical strength, thus cracks are easily caused, and it tends to cause weatherability to become poor. It is preferable that the vinylidene fluoride copolymer (A) has a glass transition temperature of −40° to 100° C. When the glass transition temperature is less than −40° C., it tends to lower the film hardness in case of using the copolymer as the coating composition. When the glass transition temperature is more than 100° C., it tends to lower the flexibility.

The structural units in the copolymer (A) having the formula (I):

$$-CH_2-CF_2- \qquad (I)$$

are used so that the obtained vinylidene fluoride copolymer (A) has excellent weatherability, stain resistance, corrosion resistance and chemical resistance similar to or close to those of PVDF. Particularly, when the composition comprising the copolymer (A) is used as the coating composition, the units (I) are used so as to get excellent properties of the coating composition or the film properties. The copolymer (A) has 50 to 90% by mole, preferably from 60 to 80% by mole, of the units (I). When the ratio of the units (I) is more than 90% by mole in the copolymer (A), the solvent solubility of the copolymer (A) or the glossiness of the coating film are poor. On the other hand, when the ratio of the units (I) is less than 50% by mole, the weatherability, chemical resistance, corrosion resistance and stain resistance are lowered.

The structural units in the copolymer (A) having the formula (II):

$$-CF_2-CF- \atop | \atop X \qquad (II)$$

wherein X is fluorine atom, chlorine atom, hydrogen atom or trifluoromethyl group are used so as to improve the polymerization reactivity upon the synthesis of the copolymer (A) or so as to improve the solvent solubility of the copolymer (A). The copolymer (A) has 1 to 30% by mole, preferably from 5 to 20% by mole, of units (II). When the ratio of the units (II) is more than 30% by mole in the copolymer (A), the compatibility with the acrylic resin, which is the characteristic of the PVDF resin, is lowered. When the ratio of the units (II) is less than 1% by mole, the polymerization reaction rate becomes slow and the molecular weight of the copolymer (A) is lowered.

The structural units in the copolymer (A) having the formula (III):

$$-CH_2-CH- \atop | \atop O-R^1OH \qquad (III)$$

wherein $R^1$ is an alkylene group having 2 to 10 carbon atoms are used so as to give the curability by reaction to the copolymer (A), finally to the coating composition. The copolymer (A) has 1 to 30% by mole, preferably from 5 to 20% by mole, of the units (III). When the ratio of the units (III) is more than 30% by mole in the copolymer (A), it is difficult to obtain such a copolymer, because of the poor copolymerizability of the monomer corresponding to the units (III) with the monomers corresponding to the units (I) and (II). Also, even if such a copolymer can be prepared, a composition comprising such a copolymer and a curing agent is poor in storage stability. When the ratio of the units (III) is less than 1% by mole, the curability is lowered. If instead of the alkylene group $R^1$, a group other than the alkylene group having 2 to 10 carbon atoms is used, for instance, when as the group $R^1$, methylene group is used, the curability becomes poor, and when as the group $R^1$, an alkylene group having more than 10 carbon atoms is used, the weatherability of the cured product becomes poor. Examples of the groups $-R^1OH$ are, for instance, a group containing hydroxyl group such as 2-hydroxyethyl, 3-hydroxypropyl, 2-hydroxypropyl, 2-hydroxy-2-methylpropyl, 4-hydroxybutyl, 4-hydroxy-2-methylbutyl, 5-hydroxypentyl or 6-hydroxyhexyl, and the like.

The structural units in the copolymer (A) having the formula (IV):

$$-CH_2-CH- \atop | \atop O-CO-R^2 \qquad (IV)$$

wherein $R^2$ is an aromatic group having 6 to 12 carbon atoms or an alkyl group having 1 to 10 carbon atoms are used so as to improve the compatibility with a curing agent reactive with —OH in the units (III) of the copolymer (A). Also, by introducing the units (IV), the solvent solubility of the copolymer (A) is improved, so the copolymer (A) satisfactorily dissolves in an ester solvent such as ethyl acetate, butyl acetate, isobutyl acetate or cellosolve acetate, a ketone solvent such as acetone, methyl ethyl ketone or methyl isopropyl ketone, and the like. Further, an aromatic hydrocarbon solvent such as toluene or xylene which is used for diluting the above-mentioned good solvent can be used. The copolymer (A) has 1 to 30% by mole, preferably from 3 to 20% by mole, of the units (IV). When the ratio of the units (IV) is more than 30% by mole in the copolymer (A), it is difficult to obtain such a copolymer, because the copolymerizability of the monomer corresponding to the units (IV) with the monomers corresponding to the units (I) and (II). Also, even if such a copolymer can be obtained, the obtained copolymer is poor in weatherability, chemical resistance, corrosion resistance, stain resistance, and the like. When the ratio of the units (IV) is less than 1% by mole, the compatibility with a curing agent becomes poor, and the number of solvents capable of dissolving the copolymer is decreased and the kinds of the solvents are limited. Examples of the groups $R^2$ are, for instance, an aromatic group having 6 to 12 carbon atoms such as phenyl, p-methylphenyl, p-tert-butylphenyl, phenethyl or benzyl, a cyclic alkyl group having up to 10 carbon atoms such as cyclohexyl, cyclopentyl, cycloheptyl or cyclooctyl, a linear or branched alkyl group having 1 to 10 carbon atoms such as methyl, ethyl, n-propyl, isopropyl, n-butyl, isobutyl, tert-butyl, pentyl, hexyl, 2-methylhexyl, 2-ethylhexyl, 3-methylhexyl or 2,2-dimethylhexyl, and the like. Among the above-mentioned groups $R^2$, the groups wherein an adjacent carbon atom to carbonyl group is a quaternary carbon atom such as tert-butyl, 1-methyl-1-propylbutyl, 1-methyl-1-ethylpentyl, 1,1-dimethylhexyl, 1,1-dimethylheptyl, 1-methyl-1-ethylhexyl and 1-methyl-1-propylpentyl are preferable, since it is easy to increase a ratio of polymerization upon synthesis of the copolymer (A). Also, methyl, ethyl and n-propyl groups are preferable since it is easy to increase the ratio of polymerization upon the synthesis of the copolymer (A). If as the group $R^2$, a group other than the aromatic group and the alkyl group having 1 to 10 carbon atoms, for instance, an alkyl group having more than 10 carbon atoms is used, the polymerization reaction rate is decreased and the ratio of polymerization is lowered, further the obtained copolymer is poor in weatherability and compatibility with a curing agent.

The copolymer (A) may have not less than two kinds of the units (II), not less than two kinds of the units (III) or not less than two kinds of the units (IV).

The copolymer (A) may contain copolymerizable units (V) other than the units (I), (II), (III) and (IV) within a range such that the physical properties of the copolymer (A) are not impaired, preferably in a range of 0 to 30% by mole. As to the other units (V), there are cited units derived from copolymerizable monomers as mentioned below.

The vinylidene fluoride copolymer (A) of the present invention can be prepared by conducting the radical copolymerization of vinylidene fluoride corresponding to the units (I) in the copolymer (A), one kind or more of fluoroolefin monomers corresponding to the units (II), one kind or more of hydroxyl group-containing vinyl ether monomers corresponding to the units (III), one kind or more vinyl carboxylates corresponding to the units (IV) and, as occasion demands, monomers copolymerizable therewith.

Examples of the fluoroolefin monomers corresponding to the units (II) are, for instance, tetrafluoroethylene, chlorotrifluoroethylene, trifluoroethylene, hexafluoropropylene, and the like.

Examples of the vinyl ether monomers corresponding to the units (III) are, for instance, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, and the like.

Examples of the vinyl carboxylates corresponding to the units (IV) are, for instance, a vinyl ester of aromatic acid such as vinyl benzoate, an aliphatic monocarboxylic acid vinyl ester having an alkyl group with 1 to 10 carbon atoms, an alicyclic carboxylic acid vinyl ester such as vinyl cyclohexanecarboxylate, and the like. The exemplified compounds are preferable from the viewpoint of the film hardness. Further, as mentioned above, it is preferable to use vinyl esters wherein the adjacent carbon atom to the ester carbonyl group is the quaternary carbon atom such as vinyl pivalate and vinyl versatate, vinyl acetate, vinyl propionate and vinyl butyrate from the viewpoint of the sufficient increase of the ratio of polymerization of the copolymer (A).

In addition to the above-mentioned essential monomers, the monomer copolymerizable therewith is used as occasion demands. Typical examples of the other monomers are, for instance, alkyl vinyl ethers such as methyl vinyl ether, ethyl vinyl ether, n-propyl vinyl ether, isobutyl vinyl ether, tert-butyl vinyl ether, n-pentyl vinyl ether, n-hexyl vinyl ether, n-octyl vinyl ether, 2-ethylhexyl vinyl ether and 2-chloromethyl vinyl ether; cycloalkyl vinyl ethers such as cyclopentyl vinyl ether, cyclohexyl vinyl ether, methylcyclohexyl vinyl ether and cyclooctyl vinyl ether; aromatic group-containing vinyl ethers such as benzyl vinyl ether, phenetyl vinyl ether and phenyl vinyl ether; fluoroalkyl vinyl ethers such as 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5,-octafluoropentyl vinyl ether, 2,2,3,3,4,4,5,5,6,6,7,7,-8,8,9,9-hexadecafluorononyl vinyl ether, perfluoromethyl vinyl ether, perfluoroethyl vinyl ether and perfluoropropyl vinyl ether; ethylene, propylene, isobutylene, vinyl chloride, vinylidene chloride, maleic anhydride, fumaric acid diesters, maleic acid diesters, acrylonitrile, and the like. Among the above-mentioned copolymerizable monomers, it is preferable to use the alkyl vinyl ethers and the cycloalkyl vinyl ethers from the viewpoint of the satisfactory increase of the ratio of polymerization.

The copolymerization is conducted in, usually, emulsion polymerization, suspension polymerization or solution polymerization. The polymerization temperature is, in any of the above-mentioned polymerization methods, usually from 0° to 150° C., preferably from 5° to 95° C. The polymerization pressure is, in any of the above-mentioned polymerization methods, usually 1 to 100 kg/cm²G.

As the solvent used in emulsion polymerization, water is used. Examples of the solvents used in suspension polymerization are, for instance, water, tert-butyl alcohol, 1,1,2-trichloro-1,2,2-trifluoroethane, 1,2-dichloro-1,1,2,2,-tetrafluoroethane, a mixture thereof, and the like. Examples of the solvents used in solution polymerization are, for instance, esters such as methyl acetate, ethyl acetate, propyl acetate and butyl acetate, ketones such as acetone and methyl ethyl ketone, a mixture thereof, and the like.

As the polymerization initiator, a redox initiator comprising an oxidizing agent such as ammonium peroxide or potassium peroxide, a reducing agent such as sodium sulfite and a transition metal such as ferrous sulfate is used in emulsion polymerization, and an azo compound such as 2,2'-azobisisobutylonitrile, 2,2'-azobis(2,4-dimethylvaleronitrile), 2,2'-azobis(2-methylvaleronitrile), 2,2'-azobis(2-cyclopropylpropionitrile) or dimethyl 2,2'-azobisisobutyrate, or an organic peroxide such as isobutyryl peroxide, octanoyl peroxide or diisopropylperoxydicarbonate is used in suspension polymerization or solution polymerization.

According to any of the above-mentioned polymerization methods, there is a case that hydrogen fluoride is eliminated from the monomers or the polymers during polymerization to acidify the polymerization system, thus resulting in gellation of the polymer. Accordingly, it is possible to add sodium hydrogencarbonate, sodium carbonate, potassium hydrogencarbonate, potassium carbonate or sodium phosphate to the polymerization system to neutralize the eliminated hydrogen fluoride.

Examples of the vinylidene fluoride copolymers (A) are, for instance, a vinylidene fluoride (VdF)/tetrafluoroethylene (TFE)/hydroxybutyl vinyl ether (HBVE)/vinyl pivalate (VPi) copolymer, VdF/chlorotrifluoroethylene (CTFE)/HBVE/VPi copolymer, VdF/TFE/HBVE/vinyl versatate (commercially available under the trademark "Veova-10" from Schell Kagaku Kabushiki Kaisha) copolymer, VdF/CTFE/HBVE/Veova-10 copolymer, VdF/TFE/HBVE/vinyl acetate (VAc) copolymer, VdF/CTFE/HBVE/VAc copolymer, VdF/TFE/HBVE/vinyl propionate (VPr) copolymer, VdF/CTFE/HBVE/VPr copolymer, VdF/TFE/HBVE/vinyl butyrate (VBu) copolymer, VdF/CTFE/HBVE/VBu copolymer, VdF/hexafluoropropylene (HFP)/HBVE/VPi copolymer, VdF/HFP/HBVE/Veova-10 copolymer, VdF/HFP/HBVE/VAc copolymer, VdF/HFP/HBVE/VPr copolymer, VdF/HFP/HBVE/VBu copolymer, VdF/TFE/HBVE/VPi/ethyl vinyl ether copolymer, VdF/CTFE/HBVE/VPi/cyclohexyl vinyl ether copolymer, and the like. The copolymer (A) is not limited thereto. The copolymer (A) may contain two or more kinds of the units (II), two or more kinds of the units (III), two or more kinds of the units (IV), or two or more kinds of the units (V). Further, the composition of the present invention may contain one or more kinds of the copolymers (A).

The copolymer (A) as prepared above can be used as a lacquer coating as it is.

Since the vinylidene fluoride copolymer (A) is excellent in solvent solubility, weatherability, stain resistance, corrosion resistance, and the like, the copolymer (A) is suitable for use as an adhesive, a sealant, a lacquer coating, a raw material for rubbers in case that the copolymer (A) has a glass transition temperature less than room temperature, and the like.

Further, the acrylic resin (B) is admixed with the copolymer (A) to give the coating composition having further improved adhesion to substrates and stain resistance. The addition of the acrylic resin causes the improvement of the light permeability of the coating film and the pigment dispersibility of the coating material.

The acrylic resins (B) used in the present invention are acrylic resins which have hitherto been used in the field of coatings. That is, the acrylic resins (B) used in the present invention are homopolymers and copolymers of lower acrylates or lower methacrylates selected from those generally referred to as "an acrylic resin" in the field of coatings [see "ENCYCLOPAEDIA CHIMICA (Kagaku Daijiten) published from Kyoritsu Shuppan Kabushiki Kaisha, 1, pages 42 and 43 1960]. Particularly, it is preferable to use (i) a homopolymer or copolymer of an alkyl ester (alkyl group having 1 to 10 carbon atoms) of an acrylic or methacrylic acid and (ii) a copolymer of an acrylate or methacrylate having a curable functional group at the side chain and/or the terminals of the main chain.

Examples of the monomers used in the preparation of the acrylic resins (i) are, for instance, lower alkyl esters of acrylate or methacrylate such as methyl acrylate or methacrylate, ethyl acrylate or methacrylate, butyl acrylate or methacrylate and cyclohexyl acrylate or methacrylate, and the like. As the acrylic resin (i), homopolymers of the above-mentioned monomer, copolymers of the above monomers and copolymers of the above monomer with a polymerizable, ethylenically unsaturated monomer are used. Examples of the polymerizable, ethylenically unsaturated monomers are, for instance, acrylates, methacrylate, acrylates having fluorine atom or chlorine atom at the α-position, fluoroalkyl acrylates or methacrylates wherein the alkyl group is substituted by fluorine atom, vinyl ethers, vinyl esters, aromatic vinyl monomers, ethylene, propylene, isobutyrene, vinyl chloride, vinylidene chloride, biesters of fumaric acid, diesters of maleic acid, acrylonitrile, methacrylonitrile, and the like. Examples of the acrylic resins (i) on the market are, for instance, "HITALOID 1005", "HITALOID 1206", "HITALOID 2230-60", "HITALOID 4001" and "HITALOID 1628A" which are commercially available from Hitachi Kasei Kogyo Kabushiki Kaisha, "DIANAL LR-1065" and "DIANAL LR-90" which are commercially available from Mitsubishi Rayon Kabushiki Kaisha, "PARAROID B-44", "PARALOID A-21" and "PARALOID B-82" which are commercially available from Rohm & Hass Co., "ELVACITE 2000" commercially available from Du Pont.

As the acrylic resin (ii), there is used a copolymer of a monomer having a curable functional group such as hydroxyl group, epoxy group or amino group and an acrylate or methacrylate, or the like. Examples of the monomers having the functional group are, for instance, hydroxyethyl acrylate or methacrylate, 2-hydroxypropyl acrylate or methacrylate, 4-hydroxybutyl vinyl ether, 2-hydroxyethyl vinyl ether, glycidyl acrylate or methacrylate, 2-aminoethyl acrylate or methacrylate, 2-aminopropyl acrylate or methacrylate, and the like. As the acrylic resin (ii), there are used copolymers of the above-mentioned monomer having the functional group and the above-mentioned lower alkyl ester of acrylic or methacrylic acid, copolymers of the monomer having the functional group, the lower alkyl ester of acrylic or methacrylic acid and the above-mentioned ethylenically unsaturated monomer, and the like. The acrylic resin (ii) is not limited thereto. Examples of the acrylic resin (ii) on the market are, for instance, "HITALOID 3004", "HITALOID 3018" and "HITALOID 3046C" which are commercially available from Hitachi Kasei Kogyo Kabushiki Kaisha, "Acrydic A810-45", "Acrydic A814" and "Acrydic 47-540" which are commercially available from Dainippon Ink Kagaku Kogyo Kabushiki Kaisha, "DIANAL LR-257" and "DIANAL LR-1503" which are commercially available from Mitsubishi Rayon Kabushiki Kaisha, "OLESTER Q166" and "OLESTER Q185" which are commercially available from Mitsui Toatsu Kagaku Kabushiki Kaisha, and the like.

A number average molecular weight of the acrylic resin (B) measured by GPC is from 3,000 to 200,000, preferably from 5,000 to 100,000. When the Mn of the acrylic resin (B) is more than 200,000, it tends to lower the solvent solubility. When the Mn is less than 3,000, it tends to lower the film hardness, thus, cracks are easily caused.

When the coating composition comprising the vinylidene fluoride copolymer (A) and the acrylic resin (B) is prepared, the acrylic resin (B) is admixed with the copolymer (A) in an amount of 1 to 900 parts by weight, based on 100 parts by weight of the copolymer (A), preferably from 3 to 300 parts by weight, more preferably from 10 to 50 parts by weight. When the acrylic resin (B) is admixed with the copolymer (A) in the above-mentioned range, the coating composition is excellent in pigment dispersibility and the coating film is excellent in light permeability and glossiness.

The coating composition comprising the copolymer (A) and the acrylic resin (B) is used in the state of a solution wherein the copolymer (A) and the acrylic resin (B) are dissolved in a solvent in a concentration of the components (A) and (B) of 5 to 95% by weight, preferably from 10 to 70% by weight. Also, when the copolymer (A) is used in the state of a solution, the copolymer (A) is dissolved in the solvent in a concentration of 5 to 95% by weight, preferably 10 to 70% by weight. Examples of the solvents are, for instance, esters, e.g., acetic esters such as methyl acetate, ethyl acetate, propyl acetate, butyl acetate, isopropyl acetate, isobutyl acetate and cellosolve acetate, ketones such as acetone, methyl ether ketone, methyl isobutyl ketone and cyclohexanone, cyclic ethers such as tetrahydrofuran and dioxane, amides such as N,N-dimethylformamide and N,N-dimethylacetoamide, aromatic hydrocarbons such as toluene and xylene, mixed solvents thereof, and the like.

The vinylidene fluoride copolymer (A) is admixed with the curing agent reactive with hydroxyl group in the copolymer (A) to give the curable composition. Also, the coating composition comprising the copolymer (A) and the acrylic resin (B) may contain the curing agent, and the obtained composition is used as a curable coating. As the curing agent, there are used compounds having two or more groups reactive with the functional group (—OH) in the copolymer (A) and, in case of the coating composition comprising the copolymer (A) and the acrylic resin (B), further with the curable moiety in the acrylic resin (B) which act as a crosslinking agent, for instance, isocyanates, amino resins, acid anhydrides, and the like. Examples of the isocyanates are, for instance, 2,4-tolylene diisocyanate, diphenylmethane-4,4'-diisocyanate, xylylenediisocyanate, isophorone diisocyanate, lysine methyl ester diisocyanate, methyl cyclohexyl diisocyanate, trimethyl hexamethylene diisocyanate, hexamethylene diisocyanate, n-pentane-1,4-diisocyanate, a trimer thereof, an aduct prepared by bocking the above-mentioned isocyanate, a polymer thereof having two or more isocyanate groups, and the like. The isocyanates are not limited thereto.

Examples of the amino resins are, for instance, methylolurea resins, methylolmelamine resins, methylolbenzoguanamine resins, resins prepared by etherificating the above-mentioned resin with an alcohol such as methanol, ethanol or butanol, and the like. The amino resins are not limited thereto.

Examples of the acid anhydrides are, for instance, phthalic anhydride, pyromellitic anhydride, mellitic anhydride, and the like. The acid anhydrides are not limited thereto.

An amount of the curing agent is, as to the curable composition comprising the vinylidene fluoride copolymer (A) and the curing agent and having no acrylic resin (B), from 0.1 to 5 equivalents per equivalent of the functional group (—OH) in the copolymer (A), preferably from 0.5 to 1.5 equivalents. As to the coating composition comprising the copolymer (A), the acrylic resin (B) and the curing agent, the amount of the curing agent is from 0.1 to 5 equivalents per equivalent of the total of the functional group (—OH) in the copolymer (A) and the functional group in the acrylic resin (B), preferably from 0.5 to 1.5 equivalents. The composition can be usually cured at 0° to 200° C. for several minutes to about ten days.

The curable or coating composition of the present invention may contain various additives used in usual coating or curable compositions such as a curing accelerator, a pigment, a pigment dispersing agent, a levelling agent, an antifoaming agent, an antigelling agent, an ultraviolet absorber and an antioxidant.

Examples of the curing accelerators are, for instances, an organotin compound, an acidic phosphate, a reaction product of the acidic phosphate and an amine, a saturated or unsaturated polyvalent carboxylic acid or anhydride, an organic titanate compound, an amine compound, lead octylate, and the like.

Examples of the organotin compounds are, for instance, dibutyl tin dilaurate, dibutyl tin maleate, dioctyl tin maleate, dibutyl tin diacetate, dibutyl tin phtharate, tin octylate, tin naphthenate, dibutyl tin methoxide, and the like.

The acidic phosphates as mentioned above are phosphoric ester containing a moiety:

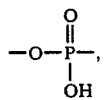

for instance, organic acidic phosphoric esters having the formula:

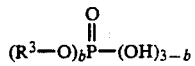

wherein b is 1 or 2 and $R^3$ is an organic residue, and the like. Concretely, there are exemplified, for instance,

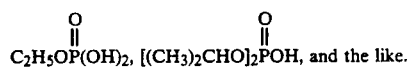

Examples of the organic titanate compounds are, for instance, titanic acid esters such as tetrabutyl titanate, tetraisopropyl titanate and triethanolamine titanate, and the like.

Examples of the amino compounds are, for instance, an amino compound such as butyl amine, octyl amine, dibutyl amine, monoethanol amine, diethanol amine, triethanol amine, diethylene triamine, triethylene tetramine, oleyl amine, octyl amine cyclohexyl amine, benzyl amine, diethylaminopropyl amine, xylylene diamine, triethylene diamine, guanidine, diphenyl guanidine, 2,4,6-tris(dimethylaminomethyl)phenol, morpholine, N-methyl morpholine or 1,8-diazabicyclo(5,4,0) undecene-7 (DBU), its salt with a carboxylic acid, a polyamide resin having a low molecular weight prepared from an excess amount of a polyamine and a polybasic acid, a reaction product prepared from an excess amount of a polyamine and an epoxy compound, and the like.

The curing accelerator may be used alone or as an admixture thereof.

An amount of the curing accelerator is, as to the composition comprising the copolymer (A) and the curing agent and having no acrylic resin (B), preferably from 0.05 to 10 parts by weight based on 100 parts by weight of the copolymer (A), more preferably from 0.1 to 5 parts by weight. As to the composition comprising the copolymer (A), the acrylic resin (B) and the curing agent, the amount of the curing accelerator is preferably from about 0.05 to about 10 parts by weight based on 100 parts by weight of the total of the copolymer (A) and the acrylic resin (B), more preferably from about 0.1 to about 5 parts by weight.

The composition of the present invention can be prepared by thoroughly admixing the components to be used.

The curable composition comprising the vinylidene fluoride copolymer (A) and the curing agent of the present invention is excellent in solvent resistance, stain resistance, corrosion resistance and the like. The curable composition is suitable for use as a curable coating composition, a sealing material, a raw material used for preparing a molded article such as a film, and the like.

Also, the coating composition comprising the copolymer (A) and the acrylic resin (B) can provide coating films having excellent glossiness, weatherability, corrosion resistance, chemical resistance, post-processability, adhesion to a substrate and hardness. The coating composition of the present invention can be applied, as an outdoor or indoor paint alike usual paints, directly to a metal, a wood, a concrete, a plastic, and the like, or can be applied to a coating film of an under coat such as a wash primer, an anti-corrosive coating, an epoxy coating, an acrylic resin coating or a polyester resin coating.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

Preparation of a vinylidene fluoride copolymer (A)

A 3 l stainless autoclave provided with a stirrer was charged with 1000 ml of ethyl acetate and 4.8 g of a mixture of 4-hydroxybutyl vinyl ether (HBVE) and vinyl pivalate (VPi) (HBVE/VPi=1/1 by mole), and dissolved oxygen was removed from the mixture by substration by nitrogen and degassing. Then, 52.8 g of tetrafluoroethylene (TFE) and 400.8 g of vinylidene fluoride (VdF) were added to the autoclave, respectively, and the inner temperature of the autoclave was elevated. When the inner temperature reached to 40° C., 2.0 g of diisopropylperoxydicarbonate (IPP) was added to the autoclave to start the polymerization. The reaction pressure was 18.0 kg/cm$^2$G at the starting time. Then, the polymerization was continued by addition of 151.2 g of a monomer mixture of VdF and TFE (VdF/TFE=88/12 by mole) and 74.1 g of a monomer mixture of HBVE and VPi (HBVE/VPi=1/1 by mole) to the autoclave, while adding 7.0 g of IPP during the polymerization.

After 15 hours from the starting time of the addition of IPP, the autoclave was cooled with water to stop the polymerization reaction, then was cooled to room temperature, the non-reacted monomers were purged, and the autoclave was opened. The obtained copolymer solution was poured into n-hexane to precipitate a product, and the product was washed and dried to give a copolymer. The yield of the copolymer was 301.4 g.

The obtained copolymer had an intrinsic viscosity, [η] (in THF, at 30° C.) of 0.12 dl/g, a number average molecular weight, Mn of 7,600 and a weight average molecular weight, Mw of 11,000, both molecular weights were measured according to GPC (polystyrene standard, developer: THF). Also, the copolymer had a thermal decomposition initial temperature of (measured by using a differential thermally thermogravimetrically measuring apparatus in air at a heating rate of 10° C./minute) of 260° C. The copolymer had a structure determined from the results of $^{19}$F-NMR and $^1$H-NMR of 74% by mole of VdF, 12% by mole of TFE, 7% by mole of VPi and 7% by mole of HBVE.

As to the obtained vinylidene fluoride copolymer, a solvent solubility and a compatibility with an acrylic resin were measured by the following methods.

Solvent solubility

To 70 g of each butyl acetate, ethyl acetate, methyl ethyl ketone and acetone is added 30 g of the obtained vinylidene fluoride copolymer at room temperature with stirring, and whether the copolymer is dissolved in each solvent or not was observed by the naked eye.

Estimation

○: The copolymer is dissolved.

X: The copolymer is not dissolved.

Compatibility

With 100 parts of a methyl polymethacrylate (PMMA) (commercially availably under the trade mark "ELVACITE 2000" from Du Pont) is blended 100 parts of the obtained copolymer, and the mixture is pressed at 180° C. under a pressure of 10 kg/cm$^2$ to form a plate having a thickness of 0.1 mm. The plate is observed with the naked eye.

Estimation

○: The plate is completely transparent, namely the copolymer is compatible with PMMA.

X: The plate is whitened, namely the copolymer is not compatible with PMMA.

The results are shown in Table 1.

EXAMPLE 2

The procedure of Example 1 was repeated except that chlorotrifluoroethylene (CTFE) was used instead of TFE to give a vinylidene fluoride copolymer.

The obtained copolymer had a yield of 303 g, [η] of 0.11 dl/g and a thermal decomposition initial temperature of 210° C. Also, the copolymer had a structure determined from the results of NMR analysis of 74% by mole of VdF, 11% by mole of CTFE, 8% by mole of VPi and 7% by mole of HBVE.

As to the copolymer, the solvent solubility and the compatibility were measured in the same manner as in Example 1.

The results are shown in Table 1.

EXAMPLES 3 TO 21

Each vinylidene fluoride copolymer having a structure shown in Table 1 was prepared in the same manner as in Example 1.

As to each of the obtained copolymer, a yield and [η] were shown in Table 1. Further, the solvent solubility and the compatibility were measured in the same manner as in Example 1.

The results are shown in Table 1.

COMPARATIVE EXAMPLE 1

A vinylidene fluoride copolymer having a structure shown in Table 1 was prepared in the same manner as in Example 1.

As to the obtained copolymer, a yield and [η] were shown in Table 1. Further, the solvent solubility and the compatibility were measured in the same manner as in Example 1.

The results are shown in Table 1.

COMPARATIVE EXAMPLE 2

A 250 ml SUS autoclave was charged with 12.5 g of ethyl vinyl ether (EVE), 12.5 g of HBVE, 50 g of vinyl 2,2-dimethylhexanoate (VDMHe), 53.8 g of methyl isobutyl ketone, 1.25 g of azobisisobutyronitrile, 1.25 g of tert-butyl peroxyoctoate and 0.75 g of 1,2,2,6,6-pentamethyl piperidine, and the substitution by nitrogen and degassing were conducted. Then, 37.5 g of TFE and 12.5 g of VdF were introduced into the autoclave with pressure, respectively, and the mixture was reacted at 55° C. for 15 hours with stirring. Then, the temperature of the autoclave was elevated to 85° C. and the reaction was continued for 4 hours to give 85 g of a fluorine-containing copolymer.

The obtained copolymer had a structure of 5% by mole of VdF, 45% by mole of TFE, 35% by mole of VDMHe and 15% by mole of HBVE.

As to the copolymer, [η], the solvent solubility and the compatibility were measured in the same manner as in Example 1.

The results are shown in Table 1.

COMPARATIVE EXAMPLE 3

A vinylidene fluoride copolymer having a structure shown in Table 1 was prepared in the same manner as in Comparative Example 2.

As to the obtained copolymer, a yield and [η] are shown in Table 1. Further, the solvent solubility and the compatibility were measured in the same manner as in Example 1. The results are shown in Table 1.

COMPARATIVE EXAMPLE 4

A 260 ml stainless steel autoclave was charged with 61.1 g of xylene and 17.5 g of ethanol, then 21.2 g of cyclohexyl vinyl ether (CHVE), 20.2 g of ethyl vinyl ether (EVE), 13.0 g of HBVE, 2.0 g of potassium carbonate and 0.48 g of azobisisobutyronitrile (AIBN) were added to the autoclave, and dissolved oxygen was removed from the mixture by solidification with liquid nitrogen and degassing. Then, 65.3 g of CTFE was introduced into the autoclave and the inner temperature of the autoclave was gradually elevated. An inner pressure of the autoclave was 6.3 kg/cm$^2$G at the time when the inner temperature reached to 65° C. Then, the reaction was continued for 8 hours under stirring, and at the time when the pressure was 0.65 kg/cm$^2$, the autoclave was cooled with water to stop the reaction. After the inner temperature reached to room temperature, the non-reacted monomers were purged and the autoclave was opened. The obtained polymer solution was filtered through a glass filter to remove potassium carbonate from the polymer solution, and 0.48 g of hydroquinone monomethyl ether was added to the filtrate. Then, ethanol was removed by using a rotary evaporator and it was concentrated.

The copolymer had a yield obtained from the results of the measurement of the polymer concentration of 110 g. A structure, [η], the solvent solubility and the compatibility of the copolymer are shown in Table 1.

COMPARATIVE EXAMPLE 5

A copolymer having a structure shown in Table 1 was prepared in the same manner as in Comparative Example 4.

A yield, [η], the solvent solubility and the compatibility of the obtained copolymer are shown in Table 1.

COMPARATIVE EXAMPLE 6

A copolymer of 50% by mole of CTFE, 10% by mole of HBVE, 15% by mole of CHVE and 25% by mole of EVE was blended with PMMA in the same manner as in Example 1.

The copolymer was not completely compatible with PMMA. Also, a test piece prepared from the composition was one remarkably whitened.

The results are shown in Table 1.

COMPARATIVE EXAMPLE 7

A copolymer having a structure shown in Table 1 was prepared in the same manner as in Example 1.

As to the obtained copolymer, the solvent solubility and the compatibility were measured in the same manner as in Example 1.

The results are shown in Table 1.

In Table 1, abbreviations of the monomers are as follows:
VdF: Vinylidene fluoride
TFE: Tetrafluoroethylene
CTFE: Chlorotrifluoroethylene
HFP: Hexafluoropropylene
HBVE: 4-Hydroxybutyl vinyl ether
VPi: Vinyl pivalate
Veova-10: Vinyl versatate commercially available from Shell Kagaku Kabushiki Kaisha
VAc: Vinyl acetate
VPr: Vinyl propionate
VBu: Vinyl butyrate
VDMHe: Vinyl 2,2-dimethylhexanoate
EVE: Ethyl vinyl ether
CHVE: Cyclohexyl vinyl ether

TABLE 1

| Structure of copolymer (A) (%) by mole | | Ex. No. | | | | | | | | | | | | | | | | | | | | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | | | | | | | |
| Structural units (I) | VdF | 74 | 74 | 68 | 68 | 69 | 70 | 70 | 72 | 60 | 64 | 71 | 80 | 70 | 69 | 79 | 62 | 72 | 70 | 65 | 71 | 81 | 80 | 5 | — | — | 15 | — | 95 |
| Structural units (II) | TFE | 12 | — | 11 | 11 | — | 10 | 10 | — | 8 | 10 | 9 | 5 | 10 | — | 11 | 11 | 8 | 10 | 21 | — | 10 | 10 | 45 | 50 | 50 | 55 | — | — |
| | CTFE | — | 11 | — | — | 10 | — | — | 7 | 11 | — | — | — | — | 10 | — | — | — | — | — | 9 | — | — | — | — | — | — | 50 | — |
| | HFP | — | — | — | — | — | — | — | 11 | 11 | 5 | 10 | — | — | — | — | — | — | — | — | — | — | — | — | — | — | — | 10 | 5 |
| Structural units (III) | HBVE | 7 | 7 | — | 11 | 11 | 10 | 10 | 10 | 10 | 11 | 10 | 5 | 9 | 11 | 5 | 9 | 10 | 10 | 9 | 10 | 5 | 5 | 15 | 10 | 10 | 30 | 10 | 5 |
| Structural units (IV) | VPi | 7 | 8 | 10 | — | 10 | 10 | 5 | — | 10 | 10 | — | 10 | 7 | 7 | 5 | — | — | — | 5 | — | — | 4 | — | — | — | — | — | — |
| | Veova-10 | — | — | — | 10 | — | — | — | — | — | — | — | — | — | — | — | 18 | — | — | — | — | — | — | — | 25 | 25 | — | — | — |
| | VAc | — | — | — | — | — | — | — | — | — | — | — | — | — | — | — | — | 12 | — | — | — | — | — | — | — | — | — | — | — |
| | Vpr | — | — | — | — | — | — | — | — | — | — | — | — | — | — | — | — | — | 10 | — | — | — | — | — | — | — | — | — | — |
| | VBu | — | — | — | — | — | — | — | — | — | — | — | — | — | — | — | — | — | — | — | 10 | — | — | — | — | — | — | — | — |
| | VDMHe | — | — | — | — | — | — | — | — | — | — | — | — | — | — | — | — | — | — | — | — | — | — | — | — | — | — | — | — |
| Structural units (V) | EVE | — | — | — | — | — | — | — | — | — | — | — | — | 4 | 3 | — | — | — | — | — | — | 4 | — | 35 | 15 | 15 | — | 25 | — |
| | CHVE | — | — | — | — | — | — | — | — | — | — | — | — | — | — | — | — | — | — | — | — | — | — | — | — | — | — | 15 | — |
| Polymerization time (hour) | | 15 | 15 | 29 | 14 | 20 | 15 | 20 | 30 | 20 | 18 | 18 | 30 | 20 | 18 | 20 | 18 | 15 | 14 | 18 | 20 | 30 | 25 | 19 | 20 | 8 | 18 | 8 | 10 |
| Yield (g) | | 301 | 303 | 353 | 209 | 305 | 285 | 192 | 242 | 215 | 226 | 215 | 353 | 309 | 285 | 320 | 385 | 306 | 235 | 299 | 85 | 90 | 110 | 102 | 110 | 102 | |
| [η] (dl/g) | | 0.12 | 0.11 | 0.13 | 0.13 | 0.10 | 0.10 | 0.13 | 0.08 | 0.14 | 0.10 | 0.13 | 0.12 | 0.11 | 0.20 | 0.13 | 0.10 | 0.11 | 0.25 | 0.19 | 0.16 | 0.21 | 0.30 | 0.31 | 0.22 | 0.15 | 0.22 | 0.23 |
| Solvent solubility | | | | | | | | | | | | | | | | | | | | | | | | | | | | | |
| Butyl acetate | | ○ | ○ | ○ | ○ | ○ | ○ | ○ | ○ | ○ | ○ | ○ | ○ | ○ | ○ | ○ | ○ | ○ | ○ | ○ | ○ | ○ | × | ○ | ○ | ○ | ○ | ○ | × |
| Ethyl acetate | | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | × |
| Methyl ethyl acetate | | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | × |
| Acetone | | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | × |
| Compatibility | | ○ | ○ | ○ | ○ | ○ | ○ | ○ | ○ | ○ | ○ | ○ | ○ | ○ | ○ | ○ | ○ | ○ | ○ | ○ | ○ | ○ | × | × | × | × | × | × | ○ |

EXAMPLE 22

In 10 g of butyl acetate was dissolved 10 g of the vinylidene fluoride copolymer obtained in Example 1, and 2.0 g of hexamethylenediisocyanate trimer (commercially available under the trademark "CORONATE EH" from Nippon Polyurethane Kogyo Kabushiki Kaisha) was added thereto to give a curable composition. An AM-712-treated aluminum plate commercially available from Nippon Test Pencil Co., Ltd. was coated with an undercoat paint commercially available under the trademark "HIPON 20 ACE" from Nippon Paint Kabushiki Kaisha in a film thickness of 45 μm, on which the obtained curable composition was brush-coated, and the panel was allowed to stand for one week at room temperature to dry and cure the film.

The cured film was observed with the naked eye. The transparency of the film was excellent. Also, the 60°-specular gloss of the film was measured according to Japanese Industrial Standard (JIS) K 5400. The film had a 60°-specular gloss of 80. Further, as to the film, the xylene-rubbing, stain resistance against felting pen, bending test, pencil strength and weatherability were measured. The results are shown in Table 2. Further the compatibility with the isocyanate curing agent is shown in Table 2.

Xylene-rubbing

The film surface is repeatedly rubbed with a tissue paper impregnated with xylene until the film surface is whitened. The number of the rubbing is shown in Table 2.

Stain resistance against marking ink

A square (2 cm × 2 cm) is marked on the film by using a red marking pen (commercially available under the trademark "Sakura Pen Tach" from Kabushiki Kaisha Sakura Kurepasu), and it is allowed to stand for 24 hours to dry. The ink was rubbed with a tissue paper impregnated with ethanol. Whether the ink remains on the film after rubbing with ethanol or not is shown in Table 2.

Bending test (1) The test is conducted according to JIS K 5400.
(2) The test is conducted according to Erichsen film test.

Pencil hardness

The test is conducted according to JIS K 5400.

Weatherability

The film is irradiated for 4,000 hours in a sunshine weather-ometer. A gloss is measured by using Color Computer SM-4 which is available from Suga Shikenki Kabushiki Kaisha.

$$\text{A gloss retention ratio (\%)} = \frac{\text{A gloss after irradiation}}{\text{A gloss before irradiation}} \times 100$$

EXAMPLE 23

A curable composition was prepared in the same manner as in Example 22 except that the vinylidene fluoride copolymer obtained in Example 2 was used instead of the vinylidene fluoride copolymer obtained in Example 1. Then, using the obtained curable composition, a cured film was prepared in the same manner as in Example 22.

The cured film was observed with the naked eye. The transparency of the film was excellent. Also, the film had a 60°-specular gloss of 82. Further, the xylene rubbing, stain resistance against marking ink, bending tests (1) and (2), pencil strength and weatherability were conducted in the same manner as in Example 22.

The results are shown in Table 2.

TABLE 2

|  | Ex. 22 | Ex. 23 |
| --- | --- | --- |
| Compatibility with isocyanate curing agent | Excellent* | Excellent* |
| Xylene-rubbing | not less than 100 times | not less than 100 times |
| Stain resistance against marking ink | The ink was completely removed from the film. | The ink was completely removed from the film. |
| Bending test (1) (JIS K 5400) | 1 T (The film had no changes such as cracks.) | 1 T (The film had no changes such as cracks.) |
| Bending test (2) (Erichsen film test) | 5 mm | 5 mm |
| Pencil hardness (JIS K 5400) | 2 H | 1 H |
| Weatherability | 95 | 85 |

(Note) *The cured film was completely transparent.

EXAMPLES 24 to 33

A curable composition was prepared in the same manner as in Example 22 except that each vinylidene fluoride copolymer shown in Table 3 was used. Then, using the obtained composition, a cured film was prepared in the same manner as in Example 22.

The obtained films were observed with the naked eye, respectively. The results of the transparency are shown in Table 3.

TABLE 3

| Ex. No. | Used PFA | Transparency |
| --- | --- | --- |
| 24 | PFA obtained in Ex. 8 | ◯* |
| 25 | PFA obtained in Ex. 9 | ◯ |
| 26 | PFA obtained in Ex. 10 | ◯ |
| 27 | PFA obtained in Ex. 15 | ◯ |
| 28 | PFA obtained in Ex. 16 | ◯ |
| 29 | PFA obtained in Ex. 17 | ◯ |
| 30 | PFA obtained in Ex. 18 | ◯ |
| 31 | PFA obtained in Ex. 19 | ◯ |
| 32 | PFA obtained in Ex. 20 | ◯ |
| 33 | PFA obtained in Ex. 21 | ◯ |

(Note) *Excellent

COMPARATIVE EXAMPLE 8

A curable composition was prepared in the same manner as in Example 22 except that the copolymer obtained in Comparative Example 2 was used. Then, using the obtained composition, a cured film was prepared in the same manner as in Example 22.

The obtained copolymer was compatible with the isocyanate curing agent, so the cured film was transparent. As to the film, the xylene-rubbing test and the weathering test were conducted in the same manner as in Example 22.

The result of the xylene-rubbing was 80 times, and the result of the weathering test was that a gloss retention ratio is 25%. That is, the obtained film was poor in film properties.

COMPARATIVE EXAMPLE 9

A curable composition was prepared in the same manner as in Example 22 except that a solution of 50 g copolymer obtained in Comparative Example 6 and 50 g of ethyl acetate was used. Then, using the obtained composition, a cured film was prepared in the same manner as in Example 22.

The obtained copolymer was compatible with the isocyanate curing agent, so the cured film was transparent. As to the film, the xylene-rubbing and the stain resistance against marking ink were conducted in the same manner as in Example 22.

The result of the xylene-rubbing was 40 times, and the result of the stain resistance was that the red ink was not completely removed from the film. That is, the obtained film was poor in film properties.

COMPARATIVE EXAMPLES 10 to 12

A curable composition was prepared in the same manner as in Example 22 except that each vinylidene fluoride copolymer obtained in Com. Ex. 1, Com. Ex. 5 and Com. Ex. 7 was used. Then, using the obtained composition, a cured film was prepared in the same manner as in Example 22.

The obtained films were observed with the naked eye, respectively. The results are shown in Table 4.

TABLE 4

| Com. Ex. No. | Used PFA | Transparency |
| --- | --- | --- |
| 10 | PFA obtained in Com. Ex. 1 | Whiten |
| 11 | PFA obtained in Com. Ex. 5 | Whiten |
| 12 | PFA obtained in Com. Ex. 7 | Whiten |

EXAMPLES 34-1 to 34-29 AND COMPARATIVE EXAMPLES 13-1 to 13-7

The vinylidene fluoride copolymer shown in Table 5 and an acrylic resin shown in Table 5 having amounts shown in Table 5 respectively were dissolved in a mixed solvent (ethyl acetate: butyl acetate: xylene=40:30:30 by weight) so as to get a solid content of 25%. Then, an isocyanate curing agent shown in Table 5 was added to the mixture in an equivalent ratio of—OH to —NCO of 1.0 to give a coating composition.

An AM-712-treated aluminum plate commercially available from Nippon Test Panel Kabushiki Kaisha was spray-coated with the obtained coating composition, and the plate was allowed to stand at room temperature for 7 days.

As to the coated aluminum plate, the following tests were conducted.

Pencil hardness

According to JIS K 5400

Adhesion

The film on the plate is cut by a knife to form one hundred squares having a size of 1 mm×1 mm, and the adhesion-pelling-off procedure is repeated 10 times by using a pressure sensitive adhesive tape. The number of the remaining squares on the plate are counted.

Solvent resistance

The film surface is repeatedly rubbed with a KIM-WIPES impregnated with xylene until the surface is whitened.

Estimation

⊚: The film is not whitened though the rubbing is repeated more than 100 times.

○: The film is whitened meanwhile the rubbing is repeated from 60 to 100 times.

X: The film is whitened by less than 60 times of rubbing.

Stain resistance against marking ink

A square (2 cm×2 cm) is marked on the film by using a red marking ink (commercially available under the trademark "Sakura Pen Tachi Red"), and it is allowed to stand for 24 hours. The mark is rubbed with ethanol. The film is observed with the naked eye.

Estimation

⊚: The ink is completely removed from the film.

○: The ink remains dimly on the film.

Δ: The ink remains more or less on the film.

X: The ink remains much on the film.

Composite stain resistance

A composition of PEAT MOSS, a cement, kaolin, silica gel, carbon black, ferric oxide and fluid paraffin (38/17/17/17/1.75/0.5/8.75 by weight) is coated on the film, the film is tested for 100 hours in an EYE SUPER US tester (a weathering tester commercially available from Iwasaki Denkin Kabushiki Kaisha) and the film is washed with water. This procedure (one cycle) is repeatedly conducted five cycles. A gloss retention ratio and color difference are measured by using Color computer SM-4 (commercially available from Suga Shikenki Kabushiki Kaisha). Also, the film appearance is observed with the naked eye.

Estimation

⊚: The stain remains scarcely on the film.

○: The stain remains a little on the film.

Δ: The stain remains much on a part of the film.

X: The stain remains much on the whole film.

Glossiness

A 60°-specular gloss is measured according to JIS K 5400.

Weatherability

A weathering test is conducted by using a sunshine weather-ometer (commercially available from Suga Shikenki Kabushiki Kaisha) at a black panel temperature of 63° C. under a humidity of 50%. The test is continued for 4000 hours at one cycle of 12 hours of rainfall and 60 minutes of irradiation. A gloss retention ratio (%) of the film after weathering test is shown in Table 5.

The results are shown in Table 5.

In Table 5, used, acrylic resins and curing agents are as follows:

Acrylic resin

| | |
| --- | --- |
| HITALOID 3004: | A solution of a polyol acrylic resin commercially available from Hitachi Kasei Kogyo Kabushiki Kaisha |
| HITALOID 1005: | A solution of a lacquer acrylic resin commercially available from Hitachi Kasei Kogyo Kabushiki Kaisha |
| HITALOID 1206: | A solution of a lacquer acrylic resin commercially available from Hitachi Kasei Kogyo Kabushiki |

-continued

| | |
|---|---|
| PARALOID B-44: | Kaisha<br>A solution of a lacquer acrylic resin commercially available from Rohm & Hass Co., |
| DIANAL LR1065: | A solution of a lacquer acrylic resin commercially available from Mitsubishi Rayon Kabushiki Kaisha |
| DIANAL LR90: | A solution of a lacquer acrylic resin commercially available from Mitsubishi Rayon Kabushiki Kaisha |
| OLESTER Q166: | A solution of a polyol acrylic resin commercially available from Mitsui Toatsu Kagaku Kabushiki Kaisha |
| OLESTER Q185: | A solution of a polyol acrylic resin commercially available from Mitsui Toatsu Kagaku Kabushiki Kaisha |
| Acrydic A-180-45: | A solution of a polyol acrylic resin commercially available from Dainippon Ink Kagaku Kogyo Kabushiki Kaisha |
| Acrydic 47-540: | A solution of a polyol acrylic resin commercially available from Dainippon Ink Kagaku Kogyo Kabushiki Kaisha |

-continued

| | |
|---|---|
| | Kabushiki Kaisha |

Curing agent

| | |
|---|---|
| CORONATE EH: | A solution of hexamethylene-diisocyanate trimer commercially available from Nippon Polyurethane Kabushiki Kaisha |
| TAKENATE D140N: | A solution of an isophorone diisocyanate adduct commercially available from Takeda Yakuhin Kogyo Kabushiki Kaisha |
| TAKENATE D170N: | A solution of a hexamethylene-diisocyanate trimer commercially available from Takeda Yakuhin Kogyo Kabushiki Kaisha |
| TAKENATE XD 170HN: | A solution of a modified hexamethylenediisocyanate trimer commercially available from Takeda Yakuhin Kogyo Kabushiki Kaisha |
| TAKENATE XD 170HN-M1: | A solution of modified hexamethylenediisocyanate trimer commercially available from Taked Yakuhin Kogyo Kabushiki Kaisha |

TABLE 5

| | Coating composition | | | | | | | | | Film property | | | | |
|---|---|---|---|---|---|---|---|---|---|---|---|---|---|---|
| | PFA | | Acrylic resin | | | Pencil hardness | Adhesion | Solvent resistance | Stain resistance | Composite stain resistance | | | Glossiness | Weatherability (%) |
| Ex. No. | Kind | Amount (part) | Kind | Amount (part) | Curing agent | | | | | Gloss retention ratio (%) | Color difference (ΔE) | Appearance | | |
| 34-1 | Ex. 1 | 90 | HITALOID 1005 | 10 | — | F | 100 | ○ | ◉ | 85 | 3.1 | ○ | 75 | 80 |
| 34-2 | Ex. 1 | 80 | HITALOID 1005 | 20 | — | F | 100 | ○ | ◉ | 91 | 2.0 | ○ | 78 | 75 |
| 34-3 | Ex. 1 | 70 | HITALOID 1005 | 30 | CORONATE EH | 2H | 100 | ◉ | ◉ | 88 | 1.9 | ◉ | 79 | 92 |
| 34-4 | Ex. 1 | 70 | HITALOID 1005 | 30 | TAKENATE D140N | 2H | 100 | ◉ | ◉ | 92 | 2.1 | ◉ | 80 | 94 |
| 34-5 | Ex. 2 | 90 | HITALOID 1005 | 10 | — | F | 100 | ○ | ◉ | 96 | 2.4 | ◉ | 82 | 90 |
| 34-6 | Ex. 2 | 80 | HITALOID 1206 | 20 | — | F | 100 | ○ | ◉ | 89 | 3.0 | ○ | 78 | 91 |
| 34-7 | Ex. 2 | 70 | PARALOID B-44 | 30 | CORONATE EH | 2H | 100 | ◉ | ◉ | 90 | 3.7 | ○ | 80 | 90 |
| 34-8 | Ex. 3 | 80 | DIANAL LR1065 | 20 | TAKENATE D140N | 2H | 100 | ◉ | ◉ | 93 | 1.9 | ◉ | 79 | 91 |
| 34-9 | Ex. 3 | 70 | DIANAL LR1065 | 30 | TAKENATE D140N | 2H | 100 | ◉ | ◉ | 93 | 2.5 | ◉ | 82 | 92 |
| 34-10 | Ex. 3 | 80 | OLESTER Q166 | 20 | TAKENATE D140N | 2H | 100 | ◉ | ◉ | 90 | 2.3 | ◉ | 75 | 90 |
| 34-11 | Ex. 4 | 70 | OLESTER Q166 | 30 | TAKENATE D170N | 2H | 100 | ◉ | ◉ | 89 | 3.4 | ○ | 81 | 92 |
| 34-12 | Ex. 4 | 80 | OLESTER Q185 | 20 | TAKENATE D170N | 2H | 100 | ◉ | ◉ | 93 | 3.1 | ○ | 80 | 90 |
| 34-13 | Ex. 4 | 70 | OLESTER Q185 | 30 | TAKENATE D170N | 2H | 100 | ◉ | ◉ | 93 | 1.6 | ◉ | 78 | 91 |
| 34-14 | Ex. 5 | 80 | OLESTER LR90 | 20 | TAKENATE XD170HN | 2H | 100 | ◉ | ◉ | 96 | 1.5 | ◉ | 76 | 90 |
| 34-15 | Ex. 5 | 70 | DIANAL LR90 | 30 | TAKENATE XD170HN | 2H | 100 | ◉ | ◉ | 94 | 2.0 | ◉ | 80 | 91 |
| 34-16 | Ex. 6 | 80 | Acrydic A-810-45 | 20 | TAKENATE D140N | 2H | 100 | ◉ | ◉ | 90 | 2.9 | ○ | 79 | 85 |
| 34-17 | Ex. 6 | 70 | Acrydic A-810-45 | 30 | TAKENATE D140N | 2H | 100 | ◉ | ◉ | 90 | 1.8 | ◉ | 78 | 86 |
| 34-18 | Ex. 7 | 80 | Acrydic 47-540 | 20 | TAKENATE D140N | 2H | 100 | ◉ | ◉ | 81 | 2.7 | ○ | 80 | 87 |
| 34-19 | Ex. 7 | 70 | Acrydic 47-540 | 30 | TAKENATE D140N | 2H | 100 | ◉ | ◉ | 90 | 1.9 | ◉ | 78 | 88 |
| 34-20 | Ex. 8 | 80 | HITALOID 3004 | 20 | CORONATE EH | 2H | 100 | ◉ | ◉ | 93 | 2.2 | ◉ | 80 | 90 |
| 34-21 | Ex. 9 | 80 | HITALOID 3004 | 20 | CORONATE EH | 2H | 100 | ◉ | ◉ | 84 | 2.0 | ○ | 79 | 93 |

TABLE 5-continued

| | Coating composition | | | | | Film property | | | | | | | |
|---|---|---|---|---|---|---|---|---|---|---|---|---|---|
| | PFA | | Acrylic resin | | | Pencil hardness | Adhesion | Solvent resistance | Stain resistance | Composite stain resistance | | | Weatherability (%) |
| | Kind | Amount (part) | Kind | Amount (part) | Curing agent | | | | | Gloss retention ratio (%) | Color difference (ΔE) | Appearance | Glossiness |
| 34-22 | Ex. 10 | 80 | HITALOID 3004 | 20 | CORONATE EH | 2H | 100 | ⊚ | ⊚ | 90 | 2.0 | ⊚ | 78 | 90 |
| 34-23 | Ex. 11 | 80 | HITALOID 3004 | 20 | CORONATE EH | 2H | 100 | ⊚ | ⊚ | 91 | 1.8 | ⊚ | 78 | 91 |
| 34-24 | Ex. 12 | 80 | OLESTER Q185 | 20 | TAKENATE D140N | 2H | 100 | ⊚ | ⊚ | 82 | 2.2 | ○ | 79 | 91 |
| 34-25 | Ex. 13 | 80 | OLESTER Q185 | 20 | TAKENATE D140N | 2H | 100 | ⊚ | ⊚ | 84 | 2.2 | ○ | 80 | 93 |
| 34-26 | Ex. 14 | 80 | OLESTER Q185 | 20 | TAKENATE D140N | 2H | 100 | ⊚ | ⊚ | 90 | 2.5 | ⊚ | 79 | 94 |
| 34-27 | Ex. 7 | 80 | OLESTER Q166 | 20 | TAKENATE XD170HN | 2H | 100 | ⊚ | ⊚ | 91 | 2.2 | ⊚ | 80 | 90 |
| 34-28 | Ex. 8 | 80 | OLESTER Q166 | 20 | TAKENATE XD170HN-M1 | 2H | 100 | ⊚ | ⊚ | 95 | 1.4 | ○ | 79 | 85 |
| 34-29 | Ex. 9 | 80 | OLESTER Q185 | 20 | TAKENATE XD170HN-M1 | 2H | 100 | ⊚ | ⊚ | 95 | 1.8 | ○ | 75 | 91 |
| Com. Ex. No. | | | | | | | | | | | | | | |
| 12-1 | | | | | | HB | 0 | X | X | 30 | 10.9 | X | 80 | 90 |
| 12-2 | | | | | | H | 0 | ⊚ | Δ | 46 | 8.4 | X | 78 | 95 |
| 12-3 | | | | | | 2H | 100 | ⊚ | Δ | 58 | 6.3 | Δ | 32 | — |
| 12-4 | | | | | | 2H | 100 | ○ | X | 65 | 7.9 | Δ | 48 | — |
| 12-5 | | | | | | 2H | 100 | ⊚ | X | 63 | 6.7 | Δ | 30 | — |
| 12-6 | | | | | | 2H | 100 | ⊚ | Δ | 47 | 8.6 | X | 32 | — |
| 12-7 | | | | | | 2H | 100 | ⊚ | X | 39 | 10.1 | X | 50 | — |
| 13-1 | Ex. 1 | 100 | — | — | — | | | | | | | | | |
| 13-2 | Ex. 2 | 100 | — | — | TAKENATE D140N | | | | | | | | | |
| 13-3 | Com. Ex. 1 | 80 | HITALOID 3004 | 20 | CORONATE EH | | | | | | | | | |
| 13-4 | Com. Ex. 2 | 70 | DIANAL LR1065 | 30 | CORONATE EH | | | | | | | | | |
| 13-5 | Com. Ex. 3 | 80 | HITALOID 3004 | 20 | CORONATE EH | | | | | | | | | |
| 13-6 | Com. Ex. 4 | 80 | OLESTER Q166 | 20 | TAKENATE D140N | | | | | | | | | |
| 13-7 | Com. Ex. 5 | 70 | OLESTER Q185 | 30 | TAKENATE D140N | | | | | | | | | |

EXAMPLES 35-1 to 35-14 and COMPARATIVE EXAMPLES 13-1 to 13-4

The vinylidene fluoride copolymer shown in Table 6 was mixed with an acrylic resin shown in Table 6 in a weight ratio (solid matter) of PFA to acrylic resin of 80/20, and a melamine resin shown in Table 6 was added to the mixture in a weight ratio (solid matter) of the mixture to the melamine resin of 70/30. Then, 100 parts of the resulting mixture were added 5 parts of a phosphoric acid catalyst (commercially available under the trademark "XL-391" from Farbweke Hoechst AG), 2 parts of a ultraviolet absorber (commercially available under the trademark "TINUVIN 900" from CIBA-GEIGY (Japan) Limited) and 1 part of a light stabilizer (commercially available under the trademark "TINUVIN 144") to give a coating composition. As the solvent, the same mixed solvent as used in Example 34 was used.

The coating composition was applied to a substrate by using a spray gun, and the film was cured at 140° C. for 30 minutes to give a test panel (film thickness: 40 to 50 μm). The substrate was obtained by coating a white surfacer (commercially available under the trademark "ORGA P-2" from Nippon Paint Kabushiki Kaisha) on a steel plate for automobiles, then coating an under coat for top coating, namely, a coating composition of 80 parts of Acrylic A322, 120 parts of "SUPER-BECKAMINE L-177-60" (commercially available from Dainippon Ink Kagaku Kogyo Kabushiki Kaisha), 4 parts of "Color Black FW-200" (commercially available from DEGUSSA AG.) and 1 part of "ALPASTE 1109MA" (commercially available from Toyo Aluminum Kabushiki Kaisha) thereon, and it was baked at 130° C. for 30 minutes.

As to the obtained test panel, the pencil hardness, adhesion, solvent resistance, composite stain resistance, glossiness and weatherability were measured in the same manner as in Example 34. Provided that, as to the composite stain resistance, only the observation with the naked eye of the film appearance was conducted. Also, as to the weatherability, the weathering test was conducted in the same manner as in Example 34. Then, the film was observed with the naked eye. Further, the humidity resistance was measured as follows:

Humidity resistance

The test panel is allowed to stand at 50° C. for 240 hours in air under RH 98%. The coating film on the panel is observed.

Estimation

○: There is no change on the film.

X: The film is remarkably deteriorated, or the film has blisters or cracks.

The results are shown in Table 6.
In Table 3, abbreviations of melamine resins are as follows:
CYMEL 303: A completely alkylated melamine resin commercially available from Mitsui-CYANAMID Kabushiki Kaisha
CYMEL 370: A methylolated melamine resin commercially available from Mitsui-CYANAMID Kabushiki Kaisha

TABLE 6

| | Coating composition | | | Film property | | | | | |
|---|---|---|---|---|---|---|---|---|---|
| | Fluorine-containing copolymer | Acryric resin | Melamine resin | Pencil hardness | Adhesion | Solvent resistance | Composite stain resistance | Glossiness (%) | Weatherability | Humidity resistance |
| Ex. No. | | | | | | | | | | |
| 35-1 | Ex. 1 | HITALOID 3004 | CYMEL 303 | Not more than HB | 100 | △ | ○ | 85 | ○* | ○* |
| 35-2 | Ex. 2 | HITALOID 3004 | CYMEL 303 | HB | 100 | △ | ○ | 85 | ○ | ○ |
| 35-3 | Ex. 3 | HITALOID 3004 | CYMEL 303 | HB | 100 | ○ | ○ | 91 | ○ | ○ |
| 35-4 | Ex. 4 | OLESTER Q166 | CYMEL 303 | F | 100 | ○ | ○ | 91 | ○ | ○ |
| 35-5 | Ex. 5 | OLESTER Q166 | CYMEL 303 | F | 100 | ○ | ○ | 92 | ○ | ○ |
| 35-6 | Ex. 6 | OLESTER Q166 | CYMEL 303 | F | 100 | ○ | ○ | 87 | ○ | ○ |
| 35-7 | Ex. 7 | HITALOID 3004 | CYMEL 370 | H | 100 | ○ | ○ | 90 | ○ | ○ |
| 35-8 | Ex. 8 | HITALOID 3004 | CYMEL 370 | H | 100 | ○ | ⊙ | 92 | ○ | ○ |
| 35-9 | Ex. 9 | HITALOID 3004 | CYMEL 370 | H | 100 | ○ | ⊙ | 91 | ○ | ○ |
| 35-10 | Ex. 10 | OLESTER Q166 | CYMEL 370 | F | 100 | ○ | ○ | 90 | ○ | ○ |
| 35-11 | Ex. 11 | OLESTER Q166 | CYMEL 370 | F | 100 | ○ | ○ | 90 | ○ | ○ |
| 35-12 | Ex. 12 | OLESTER Q166 | CYMEL 370 | F | 100 | ○ | ○ | 87 | ○ | ○ |
| 35-13 | Ex. 13 | HITALOID 3004 | CYMEL 370 | F | 100 | ○ | ○ | 91 | ○ | ○ |
| 35-14 | Ex. 14 | HITALOID 3004 | CYMEL 370 | F | 100 | ○ | ○ | 90 | ○ | ○ |
| Com. Ex. No. | | | | | | | | | | |
| 13-1 | Ex. 1 | — | CYMEL 303 | Not more than HB | 90 | ○ | X | 85 | ○ | ○ |
| 13-2 | Com. Ex. 1 | HITALOID 3004 | CYMEL 370 | F | 100 | ○ | X | 30 | — | ○ |
| 13-3 | Com. Ex. 3 | OLESTER Q166 | CYMEL 303 | F | 100 | △ | X | 32 | — | ○ |
| 13-4 | Com. Ex. 4 | OLESTER Q166 | CYMEL 370 | F | 100 | ○ | X | 35 | — | ○ |

(Note) *There is no change on the film.

Since the vinylidene fluoride copolymer of the present invention is excellent in solvent solubility, when the copolymer is used as a coating material, it can be dissolved in a widely used solvent for coatings and it is not required to treat the film at a high temperature after coating for fixing. Moreover, the obtained film is excellent in weatherability, stain resistance and corrosion resistance alike known films of PVDF.

Further, since the copolymer has hydroxyl group, the mixture of the copolymer and the curing agent can be cured by reaction. So, the curable composition comprising the vinylidene fluoride copolymer of the invention and the curing agent can be used as a curable coating material having excellent weatherability, stain resistance and corrosion resistance, and the like.

Moreover, the coating composition of the present invention which comprises the vinylidene fluoride copolymer and the acrylic resin can be dissolved in a widely used solvent for coating and can be cured by reaction. The obtained coating film is excellent in glossiness, weatherability, stain resistance, adhesion to a substrate, hardness, and the like.

In addition to the elements used in the Examples, other elements can be used in the Examples as set forth in the specification and the drawings to obtain substantially the same results.

What we claim is:

1. A vinylidene fluoride copolymer comprising 50 to 90% by mole of units having the formula (I):

$$-CH_2-CF_2- \qquad (I)$$

1 to 30% by mole of units having the formula (II):

$$-CF_2-CF- \atop |\ \ X \qquad (II)$$

wherein X is fluorine atom, chlorine atom, hydrogen atom or trifluoromethyl group,
1 to 30% by mole of units having the formula (III):

$$-CH_2-CH- \atop |\ \ O-R^1OH \qquad (III)$$

wherein $R^1$ is an alkylene group having 2 to 10 carbon atoms, and
1 to 30% by mole of units having the formula (IV):

$$-CH_2-CH- \atop |\ \ O-CO-R^2 \qquad (IV)$$

wherein $R^2$ is an aromatic group or an alkyl group having 1 to 10 carbon atoms.

2. The copolymer of claim 1, which further contains not more than 30% by mole of units other than the units (I), (II), (III) and (IV).

3. The copolymer of claim 1, wherein the adjacent carbon atom to carbonyl group in said units having formula (IV) is a quaternary carbon atom.

4. The copolymer of claim 1, wherein said units having the formula (IV) are units derived from vinyl acetate, vinyl propionate or vinyl butyrate.

5. A curable composition comprising
   (A) a vinylidene fluoride copolymer comprising 50 to 90% by mole of units having the formula (I):

$$-CH_2-CF_2- \qquad (I)$$

1 to 30% by mole of units having the formula (II):

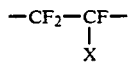 (II)

wherein X is fluorine atom, chlorine atom, hydrogen atom or trifluoromethyl group,
1 to 30% by mole of units having the formula (III):

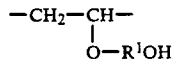 (III)

wherein $R^1$ is an alkylene group having 2 to 10 carbon atoms, and 1 to 30% by mole of units having the formula (IV):

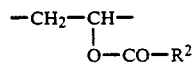 (IV)

wherein $R^2$ is an aromatic group or an alkyl group having 1 to 10 carbon atoms, and
a curing agent reactive with hydroxyl group in said copolymer (A).

6. A coating composition comprising
(A) a vinylidene fluoride copolymer comprising 50 to 90% by mole of units having the formula (I):

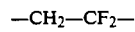 (I)

1 to 30% by mole of units having the formula (II):

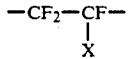 (II)

wherein X is fluorine atom, chlorine atom, hydrogen atom or trifluoromethyl group,
1 to 30% by mole of units having the formula (III):

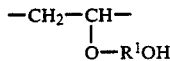 (III)

wherein $R^1$ is an alkylene group having 2 to 10 carbon atoms, and 1 to 30% by mole of units having the formula (IV):

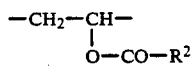 (IV)

wherein $R^2$ is an aromatic group or an alkyl group having 1 to 10 carbon atoms, and
(B) an acrylic resin.

7. The composition of claim 6, wherein said copolymer (A) further contains not more than 30% by mole of units other than the units (I), (II), (III) and (IV).

8. The composition of claim 6, which further contains a curing agent.

9. The composition of claim 6, wherein said acrylic resin (B) is a polymer of at least one alkyl esters of acrylic acid and alkyl esters of methacrylic acid, said alkyl having 1 to 10 carbon atoms.

10. The composition of claim 6, wherein said acrylic resin is a polymer of an acrylic ester or methacrylic ester having a curable functional group at the side chain and/or the polymer ends.

* * * * *